March 16, 1965  P. MÜLLER  3,174,088
STEPPING MOTOR CIRCUIT FOR IMPULSE COUNTING
Filed July 20, 1960  2 Sheets-Sheet 1

INVENTOR.
PAUL MÜLLER
BY Werner W. Kleeman
ATTORNEY

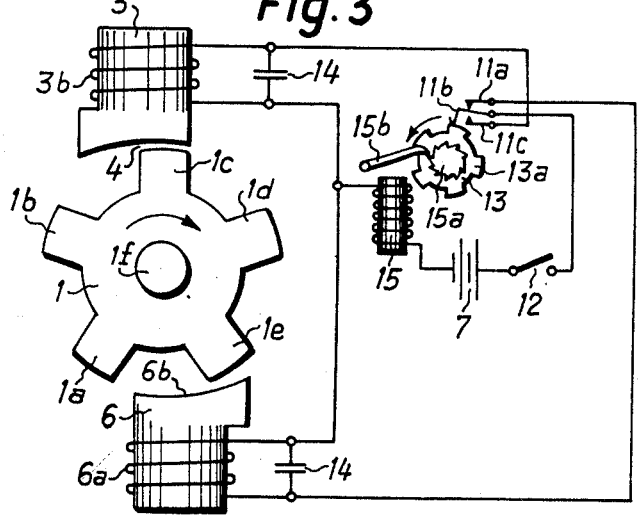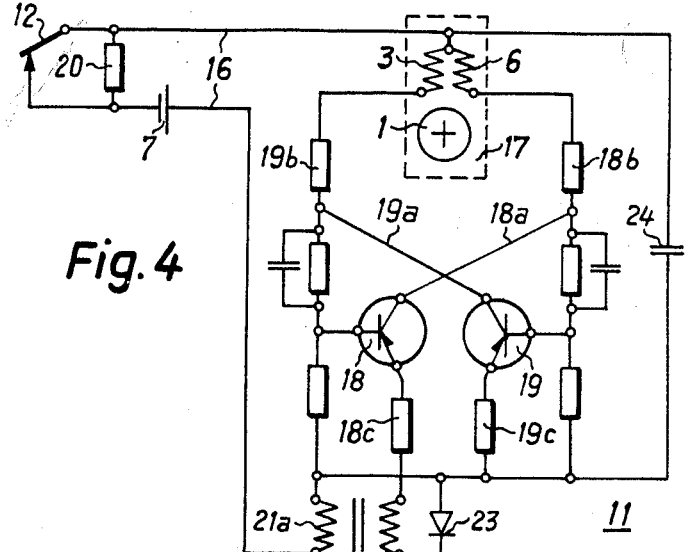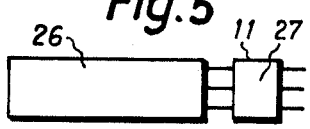
INVENTOR.
Paul Müller
BY Werner W. Kleeman
ATTORNEY

United States Patent Office 3,174,088
Patented Mar. 16, 1965

3,174,088
STEPPING MOTOR CIRCUIT FOR IMPULSE COUNTING
Paul Müller, Bad Godesberg-Mehlem, Germany, assignor to Ringsdorff-Werke G.m.b.H., Bad Godesberg-Mehlem, Germany, a corporation of Germany
Filed July 20, 1960, Ser. No. 44,076
Claims priority, application Germany, July 23, 1959, R 26,016
6 Claims. (Cl. 318—138)

The present invention relates generally to a counting mechanism and, more particularly, to a counter for counting impulses received from an external system and of the type employing electromagnets and a magnetic rotor provided with angularly displaced pole segments.

The terms impulse or impulses as employed herein is used in a general sense as applying not only to electrical impulses but to any type of impulse or condition present in an external system which is to be counted.

Counters heretofore known in the art for counting impulses as for example electrical impulses generally operate as double-contact counters wherein there is provided a magnetic pole wheel or rotor which is incrementally rotated in a step by step manner, through the spacing between its pole segments, under the influence of a pair of spaced field magnets. In devices of this type where two separate impulse responsive switches or contact members are employed, a separate impulse is required for each counting step which rotates the magnetic rotor through one-half the distance between adjacent pole segments so that two impulses are necessary to rotate the magnetic rotor through one pole division, that is to say, from one pole segment through an adjacent pole segment.

Although known counters of this type generally operate quite reliably since the magnetic rotor element is continuously held magnetically in a fixed position by either one or the other of the field magnets, these counters still have certain disadvantages which make the operation thereof unsatisfactory. The working of such counters is cumbersome since for each counting operation two consecutive impulses must be alternately applied to the two impulse responsive switches in such a manner that each of said switches receives one of said consecutively applied impulses. It will be readily apparent that should two consecutive impulses be applied to the same impulse responsive switch, the rotor element will not be incrementally rotated by the second impulse with the result that the counter will not be functioning properly nor give an accurate count. Moreover, the counting rate is considerably limited because the rotary motion of the magnetic rotor is stopped after each half step so that it must start twice for each full page.

In order to overcome these disadvantages, the counting mechanism designed in accordance with the present invention employs a single impulse responsive switch which is in circuit with a plurality of spaced electromagnets, the field windings of which are energized by means of a suitable power source. Between the spaced electromagnets there is disposed a magnetic rotor having a bank of radially extending pole segments adapted to be magnetically driven by the energized electromagnets. Additionally, there is provided switching means for alternately energizing the electromagnets in response to impulses which are to be counted, thereby ensuring that the rotor will be continuously driven by said impulses so that the half steps of the counter can be recorded instead of the full ones and an accurate count be obtained.

It is accordingly an important object of the present invention to provide means for an impulse counter which will ensure that each impulse received by said counter will be accurately recorded.

It is another object of the invention to provide a counter utilizing a single impulse responsive switch and a switching mechanism providing alternate actuation of a plurality of electromagnets so that each impulse received by said counter will be positively and accurately recorded.

It is a further object of the present invention to provide means for a counting mechanism enabling each half step of a rotor between adjacent pole segments to be recorded.

Still a further object of the present invention is to provide a counter for counting electrical impulses or the like which is compact, relatively simple in construction and extremely reliable in its operation.

These and further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIG. 1 diagrammatically illustrates the principle of operation of the counter pursuant to the present invention;

FIG. 3 illustrates a second embodiment of the counter mechanism wherein the switching mechanism is synchronously driven;

FIG. 4 illustrates a further embodiment employing an electric switching mechanism and the wiring diagram thereof, and FIGS. 5 and 6 discloses two possibilities of assembling the switching mechanism and the counter.

Figure 1:
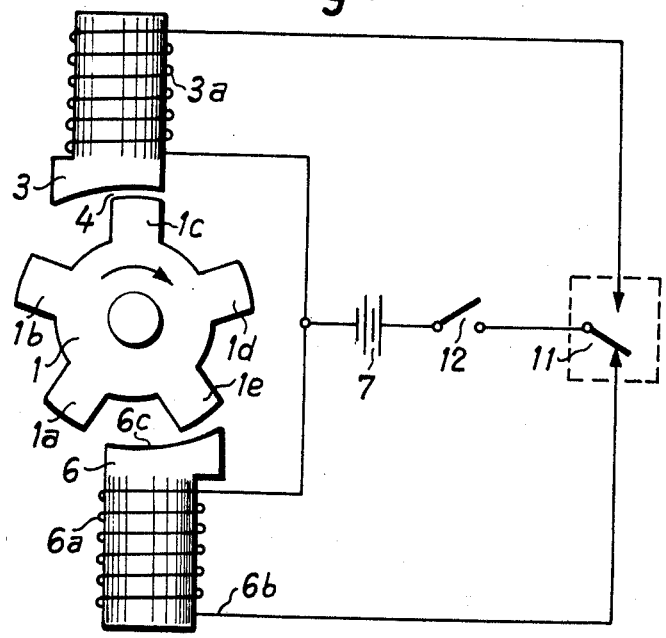

Referring now to the drawings, and more particularly to FIG. 1 thereof, the counter is provided with a plurality of spaced electromagnets 3 and 6 having field windings 3a and 6a respectively. Between the spaced electromagnets 3 and 6 there is arranged a magnetic rotor element or pole wheel 1 provided with a bank of angularly displaced radially extending pole segments, which in the illustrated embodiments are five in number and have applied thereto the reference numerals 1a, 1b, 1c, 1d and 1e. The number of pole segments employed and the spacing thereof are a matter of design in accordance with how the counter is to be operated. The magnetic rotor 1 assumes an initial starting position, by way of example, with the pole segment 1c facing the electromagnet 3 at the narrowest portion of a key-shaped air gap 4.

A suitable power source such as battery 7 is in circuit with the field windings 3a and 6a of the electromagnets 3 and 6 in order to energize the latter. A single impulse responsive switch 12 which is adapted to be actuated by a condition or impulses to be counted, as for example electrical impulses, is interposed in the circuit to close a path of travel for current supplied by the battery 7 to either one or the other of the electromagnets 3 and 6. A switching mechanism 11, the details of which will be more fully described hereinafter, is also interposed in the circuit permitting current to be delivered alternately to first one then the other of said electromagnets 3 and 6 upon actuation of the single impulse responsive switch 12 by said electrical impulses to be counted. Should the impulse responsive switch 12 be actuated by an electrical impulse, with the magnetic rotor 1 oriented so that pole segment 1c lies opposite electromagnet 3 and the switching mechanism 11 is in position to energize electromagnet 6, as clearly shown in the drawing of FIG. 1, the impulse responsive switch 12 will be closed so as to complete a circuit to the field winding 6a of electromagnet 6 through the intermediary of the switching mechanism 11 and a conductor 6b. The electromagnet 6, which is now in an energized state by means of the battery 7, will magnetically drive the rotor 1 in the direction of the arrow so that pole segment 1e will be angularly displaced one half step, that is to say, approximately half the distance between adjacent pole segments so that pole segment 1e is located opposite the face 6c of the electromagnet 6 in the region of minimum air gap. The switching mechanism or alternator 11 automatically operates in such a manner that a subsequent impulse ot be counted will cause energization of the other electromagnet 3. In this manner there is positively ensured that the electromagnets 3 and 6 will be alternately energized whenever the impulse responsive switch 12 is actuated, thereby enabling an accurate impulse count to be obtained. The switching mechanism 11, shown in FIG. 1 as a simple commutator, must be thrown after each impulse and, respectively, half step operation of the magnetic rotor 1. This arrangement enables the half steps performed by the rotor 1 due to impulse actuation of the responsive switch 12 to be counted by a counting unit associated with each half-step operation, rather than just counting the full-step operation of the magnetic rotor.

Figure 2:
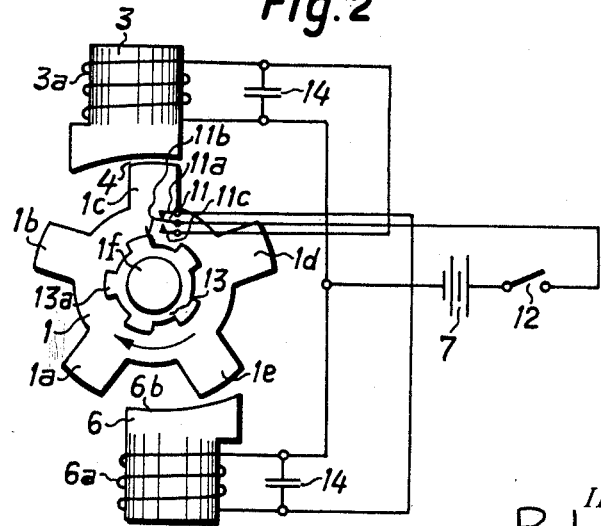
FIG. 2 illustrates a first embodiment of the counter mechanism including a mechanically operated switching or alternator mechanism.

In FIG. 2 there is illustrated a counting mechanism which is similar in construction to that hereinabove disclosed with reference to FIG. 1, like reference numerals denoting similar elements, but illustrating in detail the construction of one form of switching mechanism 11. As was the case with the counter of FIG. 1, there is here provided electromagnets 3 and 6 having field windings 3a and 6a respectively, and a magnetic rotor having pole segments 1a, 1b, 1c, 1d and 1e disposed between said electromagnets. Arranged in parallel across the field windings 3a and 6a are condenser elements 14 serving to maintain the power of the electromagnets 3 and 6, received from the power source 7, for a short time beyond the switch-off point. The switching mechanism or alternator consists of a cam member 13 which is connected to the shaft 1f of the magnetic rotor 1 for rotation therewith. The cam member 13 is provided with a plurality of cam faces 13a extending in a radial direction. Adjacent the cam member 13 are arranged contact elements 11a and 11c between which a displaceable contact element 11b is arranged which is acted upon by the respective cam faces 13a of the cam plate 13 to bring contact 11b either into registry with one of the contact elements 11a or 11c. It will be readily apparent that when contact element 11b is displaced upwardly against contact 11a the field windings 6a of electromagnet 6 are in a condition to be energized upon closing of the impulse responsive switch 12, whereas the field winding 3a of electromagnet 3 will be in condition for energization when contact elements 11b and 11c are contacting one another. The mechanical switching mechanism 11 behaves as a cam actuated commutator and effectuates a switching operation whenever the magnetic rotor 1 has one of its pole segments lying in front of one of the electromagnets 3 or 6 by properly designing the shape and position of the cam faces 13a of the cam plate 13. The impulse responsive switch 12 must be kept in its closed position at least during such time that the magnetic rotor 1 performs a complete half step of rotation between adjacent pole segments so that the switching mechanism 11 will have only executed one switching operation.

In FIG. 3 there is illustrated a counting mechanism substantially similar in structure to the counter illustrated and described with reference to FIG. 2, but teaches a further arrangement of the switching mechanism 11. The contact elements 11a, 11b and 11c of the switching mechanism is similarly actuated by the cam faces 13a of a cam plate 13 which, however, is not arranged on the shaft 1f of the rotor 1, but rather, is synchronously driven with respect to the rotor 1 by means of a suitable drive means or indexing device shown, here in the form of an auxiliary electromagnet 15 which drives a ratchet 15a and pawl 15b associated with the cam plate 13. The auxiliary electromagnet 15 of the indexing device is connected in series with the impulse responsive switch 12 so that when said switch 12 is in closed position the auxiliary electromagnet 15 as well as one of the electromagnets 3 or 6 will be energized by the power source 7. Consequently, the cam plate 13 will be in synchronism with respect to the rotational movement of the magnetic rotor 1 to ensure proper functioning of the switching mechanism 11 for the electromagnets 3 and 6. The alternate energization of the field windings 3a and 6a of said electromagnets functioning similarly to that discloesd in the description of FIG. 2.

It may be particularly advantageous, however, to eliminate all mechanically moving parts and to effectuate the switching operation purely electrically by employing an electronic switching mechanism designed as a tipping or alternator circuit.

The circuit diagram of FIG. 4 discloses such an arrangement wherein a normally closed impulse responsive switch 12 is in registry or electrically coupled via the conductors 16 with the counter 17 and the electronic switching mechanism 11. The counter 17 is similar in structure to the embodiments disclosed in FIGS. 1–3 and, accordingly, is provided with electromagnets 3 and 6 and magnetic rotor 1. A bleeder resistance 20 is bridged across the impulse responsive switch 12 and in series with the battery 7 serving as power osurce for energization of the electromagnets 3 and 6. The electronic switching mechanism 11 is designed as a bistable multivibrator and is provided with transistors 18 and 19, of which transistor 18 is in circuit with electromagnet 6 via lead line 18a and resistor 18b, whereas the transistor 19 is in circuit with the electromagnet 3 via lead line 19a and resistor 19b. An impulse transformer 21 is disposed in the circuit, the primary 21a of which is fed by the power source 7 while its secondary 22 communicates with the transistor 18 via the resistor 18c. A rectifier 23 is interposed between the secondary 22 of the impulse transformer 21, the transistor 19 and resistor 19c.

In the normal position of rest of the impulse responsive switch 12, that is when no electrical impulse or external condition is applied, the said impulse responsive switch is in its closed position and current flows from the power source 7 through the intermediary of conductors 16 to the counter 17 and the electronic switch 11. The transistor components 18 and 19 of the electronic switch 11 alternately energize the electromagnets 3 and 6 of the counter 17 in accordance with the rhythm of the impulses actuating the impulse responsive switch 12 in order to index the magnetic rotor 1 in a manner already detailed hereinabove.

Let us assume that the electromagnet 3 of the counter mechanism is energized in the rest position of the impulse responsive switch 12. The current from the power source 7 is reduced to a low residual current determined by the resistance value of the bridging resistor 20 if the impulse responsive switch is briefly opened. When the impulse responsive switch 12 is again closed, the transients fed through the primary 21a of the impulse transformer 21 upon opening and closing of said switch 12 cause a voltage surge or induced currents through the secondary transformer winding 22, said surge in turn causing the electronic switch 11 via the transistor 18 to tip, that is to say, the electromagnet 3 of the counter 17 is deenergized and the electromagnet 6 is energized. The rectifier 23 is selectively designed so as to employ only one of the induced currents resulting from opening and closing of the impulse responsive switch 12 for switching between the electromagnets 3 and 6. A capacitor 24 causes the voltage to be maintained at the counter 17 and the electronic switch 11 during the short period in which the impulse responsive switch 12 is interrupted, said bridging resistance 20 being provided for the same purpose.

FIG. 5 diagrammatically illustrates the exterior design of a counter 26 provided with an electronic switch 11. The housing 27 of the electronic switch 11 is simply plugged into a conventional double-contact counter 26. This enables existing double-contact counters to be modified to simpler operation and higher impulse frequencies by employing only a single impulse responsive switch. Naturally the counter and the electronic switch may be accommodated in a single housing 28, as shown in FIG. 6, since the switch itself requires little space.

In the impulse counters described, the counting rate is essentially doubled in comparison with a conventional type double-contact counter. Moreover, it is much simpler to assign a single impulse to the processes to be recorded than to use two consecutive impulses alternately fed to the double-contacts. It is to be understood, however, that although for convenience of description the counter has been described with reference to recording and counting electrical impulses received from an external system, the present invention is readily adaptable to counting impulses or conditions present in an external system which are not electrical in nature.

Having thus described the invention what is desired to be secured by United States Letters Patent is:

1. A counter for counting impulses and the like, comprising a plurality of spaced electromagnets; a power source for said electromagnets; a magnetic rotor disposed adjacent to, and adapted to be magnetically driven by, said electromagnets upon actuation by said power source; an impulse responsive switch in circuit with said power source and said electromagnets; and electronic switching means including an operating circuit for alternately completing a circuit between said power source and respective electromagnets, said operating circuit including transistor means in circuit with said electromagnets and an impulse transformer and rectifier coupled with said transistor means.

2. A counter for counting impulses and the like according to claim 1; including a capacitor in said operating circuit to maintain a voltage at said electromagnets and said electronic switching means when said impulse responsive switch is interrupted.

3. A counter for counting impulses and the like according to claim 1; wherein said electronic switching means is a bistable multivibrator.

4. A counter for counting impulses and the like according to claim 1; including a bleeder resistor bridged across said impulse responsive switch.

5. A counter for counting impulses and the like, comprising a plurality of spaced electromagnets; a power source for said electromagnets; a magnetic rotor disposed adjacent to, and adapted to be magnetically driven by, said electromagnets upon actuation by said power source; a normally closed impulse responsive switch in circuit with said power source and said electromagnets; and electronic switching means including an operating circuit coupled with said power source for alternately energizing said electromagnets, said operating circuit including transistor means for each electromagnet, an impulse transformer having a primary and a secondary winding, said primary winding being connected in circuit with said power source and said secondary winding being in circuit with said transistor means.

6. A counter for counting impulses and the like, comprising a plurality of spaced electromagnets; a power source for said electromagnets; a magnetic rotor disposed adjacent to, and adapted to be magnetically driven by, said electromagnets upon actuation by said power source; an impulse responsive switch in circuit with said power source and said electromagnets; and electronic switching means including transistor means electrically coupled with said power source and said electromagnets for alternately completing a circuit between said power source and respective electromagnets upon actuation of said impulse responsive switch by successive impulses which are to be counted, said electronic switching means further including an impulse transformer and a rectifier electrically coupled with said transistor means.

References Cited by the Examiner
UNITED STATES PATENTS

| | | | |
|---|---|---|---|
| 2,654,846 | 10/53 | Lohs et al. | 310—49 |
| 2,719,943 | 10/55 | Sengebusch | 310—49 |
| 2,725,512 | 11/55 | Padrow | 310—49 |
| 2,750,548 | 6/56 | Van Dalen | 310—49 |
| 2,994,023 | 7/61 | Devol | 318—138 |
| 2,994,813 | 8/61 | Towner | 310—49 |

JOHN F. COUCH, *Primary Examiner.*

MILTON O. HIRSHFIELD, ORIS L. RADER,
*Examiners.*